(12) United States Patent
Lee et al.

(10) Patent No.: US 10,810,774 B2
(45) Date of Patent: Oct. 20, 2020

(54) ELECTRONIC APPARATUS AND METHOD FOR CONTROLLING THE SAME

(71) Applicant: SAMSUNG ELECTRONICS CO., LTD., Suwon-si (KR)

(72) Inventors: Jae-sung Lee, Seoul (KR); Tae-young Na, Hanam-si (KR); Kang-won Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 15/868,501

(22) Filed: Jan. 11, 2018

(65) Prior Publication Data

US 2018/0204365 A1 Jul. 19, 2018

(30) Foreign Application Priority Data

Jan. 13, 2017 (KR) .................. 10-2017-0006147

(51) Int. Cl.
*G06T 11/60* (2006.01)
*G06T 7/55* (2017.01)
(Continued)

(52) U.S. Cl.
CPC ............... *G06T 11/60* (2013.01); *B60R 1/00* (2013.01); *G02B 27/0093* (2013.01); *G02B 27/0101* (2013.01); *G02B 27/0179* (2013.01); *G06K 9/00597* (2013.01); *G06K 9/00791* (2013.01); *G06T 7/55* (2017.01); *G06T 7/73* (2017.01);
(Continued)

(58) Field of Classification Search
CPC ............... G06T 11/60; G06K 9/00597; B60R 2300/205
See application file for complete search history.

(56) References Cited

U.S. PATENT DOCUMENTS 7,428,001 B2 * 9/2008 Schowengerdt ... G02B 27/0093
348/51
9,809,221 B2 * 11/2017 Ann ..................... B60K 35/00
(Continued)

FOREIGN PATENT DOCUMENTS

JP 201173466 A 4/2011
JP 201565614 A 4/2015
(Continued)

OTHER PUBLICATIONS

Hyeon-Jeong Sim, et al., "Characteristic Analysis on Drivers' Glance Durations with Different Running Speeds on the Expressway", 2016 The Korea Institute of Intelligent Transportation Systems. vol. 15, No. 1, pISSN 1738-0774, eISSN 2384-1729, http://dx.doi.org/10.12815/kits.2016.15.1.077 , Total 10 pages.
(Continued)

*Primary Examiner* — Samantha (Yuehan) Wang
(74) *Attorney, Agent, or Firm* — Sughrue Mion, PLLC

(57) ABSTRACT

An electronic apparatus mounted on a vehicle is provided. The electronic apparatus includes an output unit configured to output driving information on the vehicle, a sensor configured to sense a gaze of a user in the vehicle, and a processor configured to, in response to a position on a plane of the sensed gaze being included in a specific region, control the output unit to output the driving information.

16 Claims, 13 Drawing Sheets

(51) Int. Cl.
*G06K 9/00* (2006.01)
*B60R 1/00* (2006.01)
*G02B 27/01* (2006.01)
*G06T 7/73* (2017.01)
*G02B 27/00* (2006.01)

(52) U.S. Cl.
CPC ... *B60R 2300/205* (2013.01); *B60R 2300/207* (2013.01); *B60R 2300/70* (2013.01); *G02B 2027/014* (2013.01); *G02B 2027/0127* (2013.01); *G02B 2027/0134* (2013.01); *G02B 2027/0138* (2013.01); *G02B 2027/0185* (2013.01); *G02B 2027/0187* (2013.01); *G06T 2207/30201* (2013.01)

(56) References Cited

U.S. PATENT DOCUMENTS

| | | | | |
|---|---|---|---|---|
| 2010/0253493 | A1* | 10/2010 | Szczerba | G01S 13/723 340/435 |
| 2011/0001639 | A1* | 1/2011 | Sasaki | G02B 27/0101 340/995.19 |
| 2016/0085301 | A1* | 3/2016 | Lopez | G06F 3/013 345/156 |
| 2016/0240012 | A1* | 8/2016 | Gruenler | G06T 19/006 |
| 2017/0036673 | A1* | 2/2017 | Lee | G06F 3/017 |

FOREIGN PATENT DOCUMENTS

| | | |
|---|---|---|
| KR | 1020130059650 A | 6/2013 |
| KR | 101646340 B1 | 8/2016 |

OTHER PUBLICATIONS

Hyungil Kim, et al., "Look at Me: Augmented Reality Pedestrian Warning System Using an In-vehicle Volumetric Head Up Display", IUI 2016 • Wearable and Mobile IUI 1, Mar. 7-10, 2016, Sonoma, CA, USA, pp. 294-298.

Joceline Roge, et al., "Influence of age, speed and duration of monotonous driving task in traffic on the drivers useful visual field", Vision Research, vol. 44, 2004, pp. 2737-2744.

Miguel A. Recarte and Luis M. Nunes, "Mental Workload While Driving: Effects on Visual Search, Discrimination, and Decision Making", Journal of Experimental Psychology: Applied, 2003, vol. 9, No. 2, pp. 119-137.

Andrew P. Collins, "Is Gesture Control Your Next Car's Coolest Feature or Another Gimmick?", An Article in JALOPNIK, 2016, Retrieved from https://jalopnik.com/is-gesture-control-your-next-cars-coolest-feature-or-an-1751678557, Total 4 pages.

* cited by examiner

ELECTRONIC APPARATUS AND METHOD FOR CONTROLLING THE SAME

CROSS-REFERENCE TO RELATED APPLICATIONS

This application claims the benefit of priority from Korean Patent Application No. 10-2017-0006147, filed on Jan. 13, 2017, in the Korean Intellectual Property Office, the disclosure of which is incorporated herein by reference in its entirety.

BACKGROUND OF THE INVENTION

1. Field of the Invention

The present general inventive concept generally relates to an electronic apparatus and a method for controlling the same, and more specifically, to an electronic apparatus which projects an image onto a windshield of a vehicle and a method for controlling the same.

2. Description of the Related Art

Automobile-related companies including domestic and international automakers are presenting advanced technologies considering driver's safety. A Head Up Display (HUD) technology is a notable example. The HUD refers to a technology for projecting information which has been displayed through the existing dashboard, for example, vehicle information or driving directions, onto a windshield in front of a driver in order to enable the driver to focus on driving keeping the eyes to the front. The HUD technology was originally developed for aircrafts and is being applied to a car.

According to one of the commonly used methods of the HUD technology, the information is provided to the driver in the manner of projecting the driving information onto the windshield in the form of Augmented Reality through a projector installed on the dashboard. However, according to the above HUD method, the projected driving information is mixed with a background reflected on a rear surface of the windshield, which may increase the driver's cognitive load with respect to the front. The HUD method may control the driving information projected onto the windshield to be displayed or to disappear in response to a gesture or voice in order to solve this problem, but this method based on the gesture or voice may distract the driver's attention or cause inconveniences to a fellow passenger. Further, according to this methods, a position of the driver's gaze and a focus are changed every time the driver watches the driving information projected onto a certain region of the windshield while driving, which may distract the driver's visual attention and cause the visual fatigue.

Accordingly, there is a necessity for a method for displaying or not displaying the driving information in a proper gaze direction according to the driver's intention.

SUMMARY OF THE INVENTION

The present disclosure has been provided to address the aforementioned and other problems and disadvantages occurring in the related art, and an aspect of the present disclosure provides an electronic apparatus which provides the driving information based on a gaze direction of a user by utilizing a three-dimensional (3)D gaze tracking method and a method for controlling the same.

According to an embodiment of the present disclosure, there is provided an electronic apparatus. The apparatus includes an output unit configured to output driving information on a vehicle, a sensor configured to sense a gaze of a user in the vehicle, and a processor configured to, in response to a position on a plane of the sensed gaze being included in a specific region, control the output unit to output the driving information.

In response to a gaze coordinate representing a direction of the sensed gaze on a virtual plane being located in a predetermined specific region of the virtual plane, the processor may determine that the direction of the sensed gaze points the specific region.

The processor may identify an output depth of the driving information based on a distance to an object corresponding to the position on the plane of the sensed gaze.

The processor may identify an output depth of the driving information based on a depth of a focus of the sensed gaze.

In response to a direction of the sensed gaze moving from the outside to the inside of the specific region, the processor may output the driving information to the output depth identified based on the depth of the focus.

The processor may identify the output depth of the driving information to be proportional to the depth of the focus of the sensed gaze.

The processor may identify a region of a windshield of the vehicle corresponding to the specific region as an output region for outputting the driving information.

The processor may set the specific region so that the output region is fixed to one region of the windshield.

The apparatus may further include a camera configured to photograph an object outside the vehicle. The processor may identify a region which is adjacent to a region where the object is viewed through the windshield of the vehicle as an output region for outputting the driving information based on an image photographed by the camera.

The object may include other vehicle located in front of the vehicle. The processor may identify a lower part of a region where the other vehicle is viewed through the windshield as the output region.

In response to a direction of the sensed gaze not pointing the specific region, the processor may increase transparency of the driving information and outputs the driving information.

According to an embodiment of the present disclosure, there is provided a method for controlling an electronic apparatus. The method includes sensing a gaze of a user in a vehicle, identifying whether a position on a plane of the sensed gaze is included in a specific region, and outputting driving information on the vehicle in response to identifying that the position on the plane of the sensed gaze is included in the specific region.

In response to a gaze coordinate representing a direction of the sensed gaze on a virtual plane being located in a predetermined specific region of the virtual plane, the identifying may include identifying that the direction of the sensed gaze points the specific region.

The outputting may include identifying an output depth of the driving information based on a distance to an object corresponding to the position on the plane of the sensed gaze and outputting the driving information to the identified output depth.

The outputting may include identifying an output depth of the driving information based on a depth of a focus of the sensed gaze and outputting the driving information to the identified output depth.

In response to a direction of the sensed gaze moving from the outside to the inside of the specific region, the outputting may include outputting the driving information to the output depth identified based on the depth of the focus.

The outputting may include identifying the output depth of the driving information to be proportional to the depth of the focus of the sensed gaze.

The method may further include identifying a region of a windshield of the vehicle corresponding to the specific region as an output region for outputting the driving information.

The identifying may include setting the specific region so that the output region is fixed to one region of the windshield.

The identifying may include identifying a region which is adjacent to a region where an object outside the vehicle is viewed through the windshield of the vehicle as an output region for outputting the driving information based on an image photographed by a camera for photographing the object.

The object may include other vehicle located in front of the vehicle. The identifying may include identifying a lower part of a region where the other vehicle is viewed through the windshield as the output region.

In response to a direction of the sensed gaze not pointing the specific region, the outputting may include increasing transparency of the driving information and outputting the driving information.

According to the above-described various embodiments of the present disclosure, the electronic apparatus and the method for controlling the same may minimize deviation of the driver's gaze when watching an HUD image thereby enhancing the driver's convenience and providing safer driving conditions.

BRIEF DESCRIPTION OF DRAWINGS

The above and/or other aspects of the present inventive concept will be more apparent by describing certain embodiments of the present inventive concept with reference to the accompanying drawings, in which.

DETAILED DESCRIPTION OF PREFERRED EMBODIMENT

Figure 1:
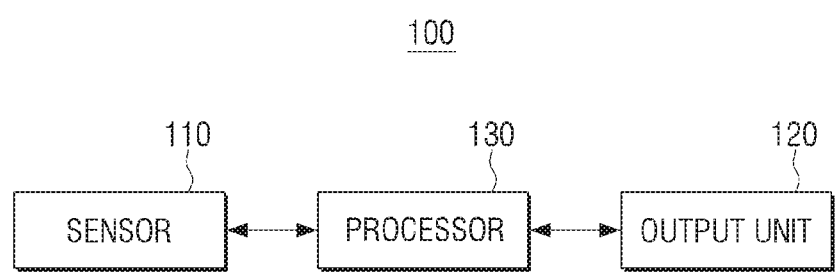
FIG. 1 is a block diagram illustrating a simple structure of an electronic apparatus according to an embodiment disclosed herein.

Hereinafter, a description method of the present disclosure and accompanying drawings will be given in advance of presenting detailed embodiments of the present disclosure.

The terms used in the following description and claims are widely used common expressions selected by considering functions in various embodiments of the present disclosure. However, the terms may vary depending upon an intention of a person having ordinary skill in the art, legal/technical interpretations, or advent of new technologies. Some of the terms might have been arbitrarily selected by an applicant, and the terms may be interpreted as defined herein. Unless otherwise defined, the terms may be interpreted based on overall descriptions of the present disclosure and common technical knowledge in the art.

In the following description, like drawing reference numerals and symbols refer to the like elements which perform substantially the same function, even in different drawings, for convenience in explanation and better understanding. That is, a plurality of drawings may include elements having the same reference numerals, but it does not signify that the plurality of drawings relate to one embodiment.

In the following description and claims, a term including an ordinal, such as, 'first' or 'second,' may be used to distinguish the elements. The ordinal is to distinguish the same or similar elements and does not limit the meaning of the term. For instance, ordinals do not affect an order of use or an order of arrangement of the elements expressed with the ordinals. Respective ordinals may be replaced with each other, if necessary.

A term in a singular form includes a plural form unless it is intentionally written that way. A term, such as, 'include' or 'form,' refers to the disclosed features, numbers, steps, operations, elements, parts, or combinations thereof and is not intended to exclude any possibilities of existence or addition of one or more other features, numbers, steps, operations, elements, parts, or combinations thereof.

A term 'module,' 'unit,' or 'part' refers to an element which performs one or more functions or operations. The 'module,' 'unit,' or 'part' may be realized as hardware, software, or combinations thereof. A plurality of 'modules,' 'units,' or 'parts' may be integrated into at least one module or a chip and realized as at least one processor (not shown), except for the case where the respective 'modules' or 'units' need to be realized as discrete specific hardware.

In the following embodiments, when it is described that one part is connected to another part, the connection includes a direct connection between the parts and an indirect connection through other medium. Further, the expression that a part 'includes' a certain element signifies that the part may further include other elements on top of the certain element, not excluding other elements than the certain element, unless otherwise described.

Certain embodiments are described below in greater detail with reference to the accompanying drawings.

FIG. 1 is a block diagram illustrating a simple structure of an electronic apparatus according to an embodiment disclosed herein. Referring to FIG. 1, an electronic apparatus 100 according to an embodiment disclosed herein includes an output unit 110, a sensor 120, and a processor 130.

In the present disclosure, the electronic apparatus 100 may refer to an apparatus which is capable of outputting the driving information, such as, a current speed, a fuel remaining amount, or navigation information of a vehicle, as graphic images and may be called 'Head Up Display (HUD).' The vehicle refers to the two-wheeled or four-wheeled transportation means, for example, a motorcycle or an automobile. In following description, the vehicle will be called 'car' for convenience in explanation.

The output unit 110 outputs the driving information on the car. To be specific, the output unit 110 may output the driving information on the car on a windshield of the car. The windshield may refer to a front glass panel which is located in the direction in which a user in the car mostly watches. The output unit 110 may be realized so as to project an image including the driving information on the car onto the windshield. In this case, the user may generally refer to a driver of the car and may include a person who uses the car, for example, a passenger on a passenger seat or a passenger in a driverless car. Hereinafter, the user will be called 'driver' for convenience in explanation.

The driving information may refer to information related to the driving of the car of the driver, for example, speed information, direction information, traffic sign information, traffic light information, destination information, a remaining distance to the destination, the fuel remaining amount, or route change. The driving information may be generated as the electronic apparatus 100 detects movement of the car or receives position information through satellite communications. When the electronic apparatus 100 operates with a navigation device in the car, the driving information may be diverse information received from the navigation device. The driving information is projected onto the windshield in the form of the Augmented Reality, and the driver may drive the car keeping the eyes to the front where the driving information is outputted without shifting the gaze towards a separate terminal to check the driving information. Accordingly, it is possible to prevent the distraction of the driver's gaze.

The output unit 110 may include a transparent Micro Electro Mechanical System (MEMS) display device. The transparent MEMS may variously adjust a size of a region onto which the driving information is projected, that is, an eye box.

Figure 2:
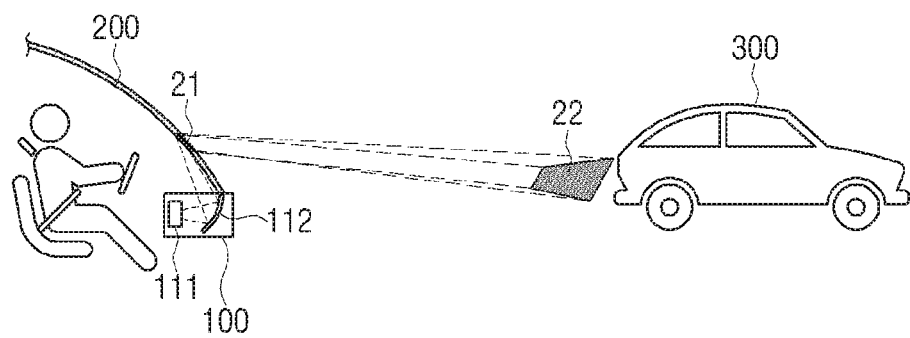
FIG. 2 is a diagram provided to describe a method for projecting driving information of an electronic apparatus according to an embodiment disclosed herein.

Referring to FIG. 2, the output unit 110 may include a projector 111 for projecting the driving information and an aspheric mirror 112 for changing an optical path of the driving information projected by the projector 111 and reflecting the driving information in a windshield 200. The output unit 110 may further include at least one mirror (not shown) for reflecting the driving information projected by the projector 111 in the aspheric mirror 112.

When the driving information projected by the projector 111 is reflected once though the aspheric mirror 112, the right side and the left side of the driving information are reversed. Accordingly, the processor 130 may control the right and left sides of the driving information which will be projected by the projector 111 to be reversed in advance. Further, the processor 130 may control an angle or a position of the aspheric mirror 112 included in the output unit 110 or control a projecting angle or direction of the projector 111 to adjust a region 21 of the windshield 200 onto which the driving information is projected.

The sensor 120 senses the gaze of the driver in the car. To be specific, the sensor 120 may include a couple of cameras and analyze a position of the pupils, a gaze direction, and a focus of the driver by using the images respectively photographed by the couple of cameras.

The processor 130 controls overall operations of the electronic apparatus 100.

Specially, in response to a position on a plane of the sensed gaze being included in a specific region, the processor 130 may control the output unit 110 to output the driving information.

To be specific, in response to a gaze coordinate representing a direction of the sensed gaze on a virtual plane being located in a predetermined specific region of the virtual plane, the processor 130 may identify that the direction of the sensed gaze points the specific region.

By way of example, when the driver watches a region located on a lower part of a rear side of a preceding car 300, the processor 130 may control the output unit 110 to output driving information 22 on the region 21 where the region on the lower part of the rear side of the preceding car 300 is viewed through the windshield. A detailed description on this operations will be provided below.

Figure 3:
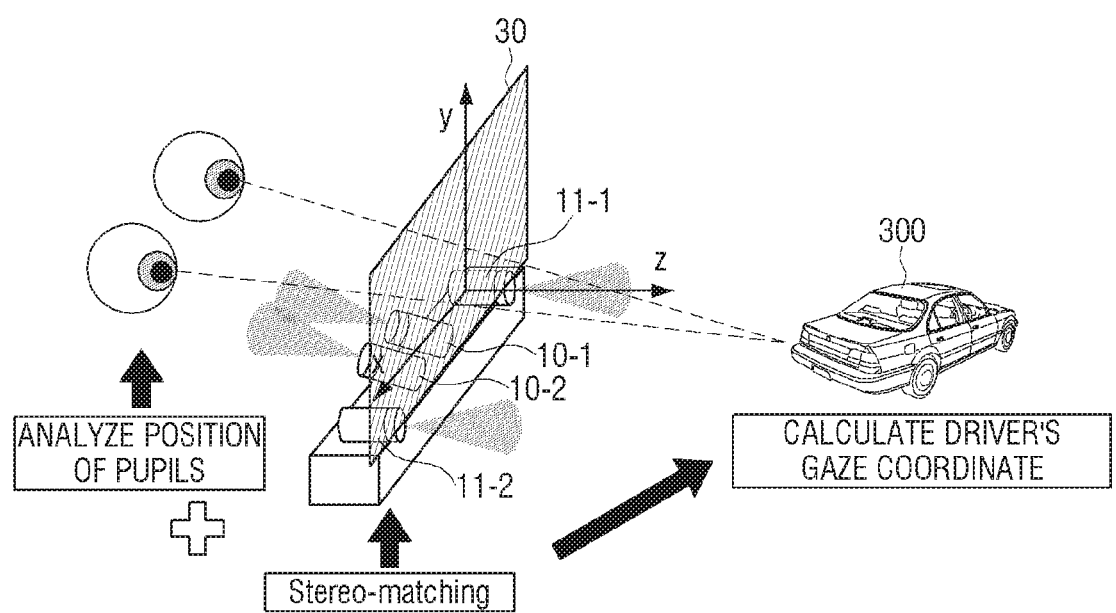
FIG. 3 is a diagram provided to describe a method for tracking a driver's gaze by using a sensor according to an embodiment disclosed herein.

Referring to FIG. 3, the sensor 120 may include a plurality of first cameras 10-1, 10-2. The plurality of first cameras 10-1, 10-2 may photograph the driver in the car, respectively. The processor 130 may analyze the position of the driver's pupils by using the images photographed by the first cameras 10-1, 10-2. The processor 130 may calculate the gaze coordinate (x, y) representing the position on a virtual plane 30 of the driver's gaze by using the analyzed information on the position of the driver's pupils. In this case, the gaze coordinate (x, y) may refer to a two-dimensional coordinate of a point through which the driver's gaze passes on the virtual plane 30. Accordingly, the processor 130 may identify whether the calculated gaze coordinate (x, y) is located in the predetermined specific region of the virtual plane 30. In response to identifying that the calculated gaze coordinate (x, y) is located in the predetermined specific region of the virtual plane 30, the processor 130 may identify that the direction of the sensed gaze points the specific region.

In response to identifying that the position on the virtual plane 30 of the sensed gaze is included in the specific region, the processor 130 may output the driving information on the windshield 200. In this case, the specific region may be a fixed position on the virtual plane 30 or may be a region which varies depending upon a location of an object which the drivers watches, according to an embodiment.

The object may be an object which is located outside the car and viewed to the driver through the windshield 200. The object may include various kinds of objects, for example, a preceding car, a tree, or a traffic sign, and it is preferable that the object is an object which the driver watches mostly while driving. The driver mostly watches the rear side of the preceding car while driving, and it is assumed that the object is a preceding car in the following embodiments.

The specific region may be a position on the virtual plane 30 which corresponds to a location of the preceding car 300 in the images of the front side of the car photographed by second cameras 11-1, 11-2. When the position on the virtual plane 30 of the sensed gaze is included in the specific region, it may signify that the driver watches the preceding car 300. The second cameras 11-1, 11-2 may be installed inside or outside the car so as to photograph the front side of the car. According to an embodiment, the second cameras 11-1, 11-2 may be included in the electronic apparatus 100 or may be realized separately from the electronic apparatus 100. In the case that the second cameras 11-1, 11-2 are realized separately from the electronic apparatus 100, the images photographed by the second cameras 11-1, 11-2 may be transmitted in real time to an image receiver (not shown) of the electronic apparatus 100. According to an embodiment, a block box camera installed in a car may be used as the second cameras 11-1, 11-2.

The processor 130 may recognize the preceding car 300 which is the predetermined object from the images photographed by the second cameras 11-1, 11-2 and detect a location of the preceding car in the photographed images. In the photographed images, the processor 130 may search a region which is one-to-one matched with the gaze coordinate of the sensed driver's gaze and identify whether the driver watches the rear side of the preceding car 300 by using the location of the preceding car 300 in the photographed images and the gaze coordinate of the sensed gaze. In response to identifying that the driver watches the rear side of the preceding car 300, the preceding car 300 may be an object corresponding to the position on the virtual plane 30 of the gaze sensed by the first cameras 10-1, 10-2. In response to the position on the virtual plane 30 of the sensed gaze being included in the specific region, the processor 130 may control the output unit 110 to output the driving information.

Figure 4:
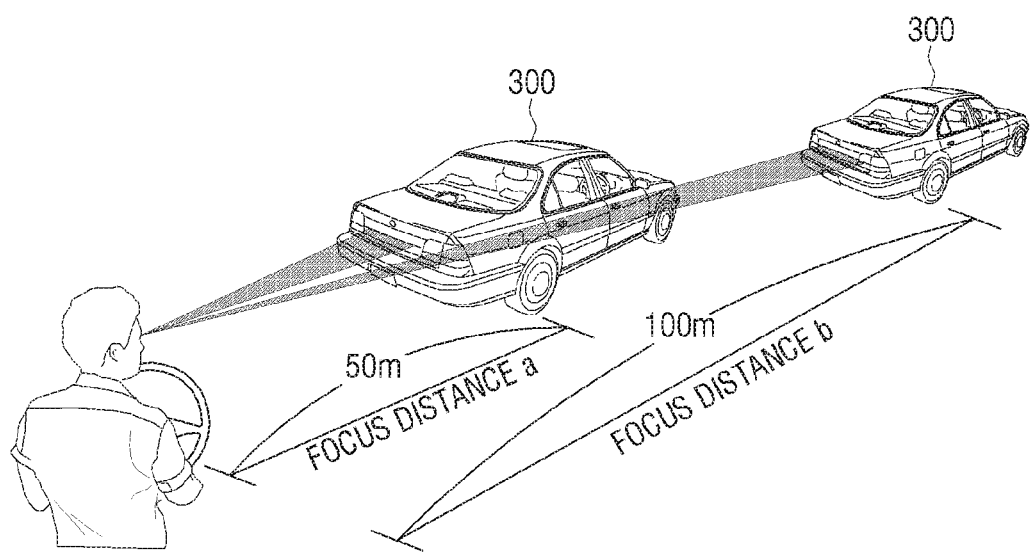
FIG. 4 is a diagram provided to describe a change of a depth of the driving information depending upon a change of a driver's focus distance according to an embodiment disclosed herein.

The processor 130 may identify an output depth of the driving information based on a distance to the object corresponding to the position on the virtual plane 30 of the sensed gaze. This operation is to change the output depth of the driving information based on a distance between the driver and the object so that a change of a focus is minimized when the driver checks the driving information while watching the object. As an example, as illustrated in FIG. 4, when the preceding car 300 is spaced 50 meters apart from the driver, and the preceding car 300 is spaced 100 meters apart from the driver from a focus distance a of the gaze with respect to the preceding car 300, a focus distance b of the gaze with respect to the preceding car 300 may be greater. Accordingly, the output depth of the driving information may be identified so as to correspond to the distance to the preceding car 300 which the driver watches. A detailed description on this operation will be provided below with reference to FIG. 5.

Figure 5:
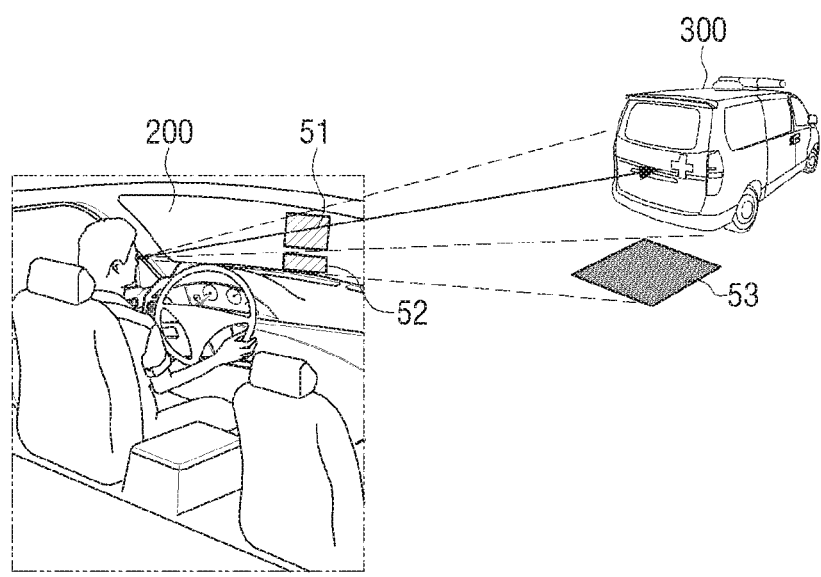
FIG. 5 is a diagram provided to describe a region onto which the driving information is projected and a depth of the projected driving information according to an embodiment disclosed herein.

FIG. 5 is a diagram provided to describe a region onto which the driving information is projected and a depth of the projected driving information according to an embodiment disclosed herein.

In response to detecting the position of the preceding car 300 in the photographed images, the processor 130 may identify a region 51 where the preceding car 300 in front of the driver is viewed to the driver through the windshield 200 by using information on the relative locations of the second cameras 11-1, 11-2 which generate information on the driver, the windshield 200, and the front side of the car.

To be specific, the processor 130 may identify the region 51 where the preceding car 300 is viewed through the windshield 200 at the positions of the second cameras 11-1, 11-2 by adjusting magnification of the photographed images to be an actual size viewed at the positions of the second cameras 11-1, 11-2. In this case, the processor 130 may finally identify the region 51 by adjusting the position of the region where the preceding car 300 is viewed through the windshield 200 by an amount of the difference of the relative positions of the pupils of the driver on the driver seat and the second cameras 11-1, 11-2.

In this case, diverse information, such as, information on the absolute or relative positions of the driver, the windshield 200, and the second cameras 11-1, 11-2 and the information on the rear side of the preceding car 300 for recognizing the preceding car 300 (particularly, a shape and a color of the rear side of the preceding car 300), may be pre-stored in a Read-Only Memory (ROM) 131 in the processor 130, a storage 140 in the electronic apparatus 100, or a detachable memory.

In response to identifying the region 51 where the preceding car 300 is viewed through the windshield 200, the processor 130 may identify a predetermined region 52 which is adjacent to the region 51 as a projection region onto which the driving information is projected. In the embodiment of FIG. 5, the processor 130 may identify the predetermined region 52 as the projection region 52 onto which the driving information is projected based on a region where the preceding car 300 is viewed through the windshield 200 out of the region where a road surface between the driver's car and the preceding car 300 is viewed through the windshield 200. Specially, the driver usually watches the rear side of the preceding car 300, and it is preferable that the projection region 52 onto which the driving information is projected is set to be a region where a lower part 53 of the rear side of the preceding car 300 is viewed, out of the region where the road surface between the driver's car and the preceding car 300 is viewed through the windshield 200. In this case, the projection region 52 is identified based on the region 51 where the preceding car 300 is viewed through the windshield 200 and may vary depending upon the location of the preceding car 300.

That is, in the region where the road surface between the driver's car and the preceding car 300 is viewed through the windshield 200, the driving information may be projected onto the region 52 which is adjacent to the region 51 where the preceding car 300 is viewed. Accordingly, the distraction of the driver's gaze may be minimized when the driver checks the driving information while watching the rear side of the preceding car 300.

However, in the above embodiment, even though the deviation of the driver's gaze is minimized as the projection region 52 onto which the driving information is projected is adjusted to be close to the region 51 where the preceding car 300 is viewed, there still remains a problem where the focus of the pupils should be changed every time the driver checks the driving information displayed on the windshield 200. To be specific, there is the inconvenience where the driver should change the focus of the pupils to correspond to the projection region 52 of the windshield 200 in order to check the driving information while watching the preceding car 300. According to an embodiment to minimize this inconvenience, a depth of the driving information projected onto the windshield 200 may be adjusted to correspond to the focus of the pupils of the driver watching the preceding car 300, thereby minimizing the change of the focus for checking the driving information.

To be specific, the processor 130 may adjust the output depth of the driving information based on the distance between the driver and the preceding car 300 and predict the distance between the driver and the preceding car 300 by analyzing the photographed images of the front side for the adjusting operation.

According to an embodiment disclosed herein, the electronic apparatus 100 for measuring the distance between the driver and the preceding car 300 may measure the distance to the preceding car 300 by using the images of the front side photographed by the second cameras 11-1, 11-2.

The processor 130 may measure the distance between the driver and the recognized preceding car 300 though a triangulation method using the second cameras 11-1, 11-2. In this case, the processor 130 may use a distance between the second cameras 11-1, 11-2, the focuses of the second cameras 11-1, 11-2, and a disparity value of two images photographed by the second cameras 11-1, 11-2.

The disparity may refer to a difference of the positions of the preceding car 300 in the respective images photographed by the second cameras 11-1, 11-2. The disparity may be inversely proportional to the distance between the driver and the preceding car 300. Accordingly, the disparity becomes greater in response to the preceding car being located close to the driver and becomes smaller in response to the preceding car being located far from the driver. The disparity becomes greater with the longer distance between the second cameras 11-1, 11-2, and the distance between the driver and the preceding car 300 may be measured more accurately with the greater disparity. Accordingly, it is preferable that the distance between the second cameras 11-1, 11-2 is greater.

The focus and the disparity value may be acquired from the images photographed by the second cameras 11-1, 11-2. The distance between the second cameras 11-1, 11-2 may be a pre-stored value in the electronic apparatus 100 or a pre-input value from a user.

The distance measuring process may include a camera calibration process of estimating inner/outer variables of the second cameras 11-1, 11-2 and a stereo-matching process of estimating a depth value by using the disparity of the images photographed by the second cameras 11-1, 11-2. The stereo-matching may be performed by matching only the vertical edges or matching the entire images. For example, the stereo-matching may include a Semi-Global Matching (SGM) matching method. In response to the distance between the second cameras 11-1, 11-2 and the preceding car 300 being measured by this process, a distance between an average position of the pupils of a person on a driver seat of a car and the preceding car 300 may be calculated, and a distance between the driver and the preceding car 300 may be predicted.

In response to the distance between the driver and the preceding car 300 being predicted, the output depth of the driving information may be identified so as to be proportional to the predicted distance. That is, the processor may increase the output depth of the driving information in response to the longer the distance between the driver and the preceding car 300 and decrease the output depth of the driving information in response to the shorter distance between the driver and the preceding car 300. For this operation, the electronic apparatus 100 may pre-store a table where the depth of the driving information is matched with the distance between the driver and the preceding car 300.

The processor 130 may adjust the output depth of the driving information in real time by using the pre-stored table.

As another method for measuring the distance between the driver and the preceding car 300, the processor 130 may predict the distance between the driver and the preceding car 300 based on the size of the preceding car 300 in the photographed images of the front side. In this case, the electronic apparatus 100 may pre-store a table where the distance between the driver and the preceding car 300 is matched with the size of the preceding car 300 in the photographed images of the front side. The processor 130 may identify the distance between the driver and the preceding car 300 in real time by using the pre-stored table. In the embodiment, the processor 130 may use only the image photographed by one of the camera 11-1 or 11-2 for photographing the front side of the car.

On top of the method using the second cameras 11-1, 11-2, the distance between the driver and the preceding car 300 may be measured by various methods including radar, and the method for measuring a distance does not limit the technical concept of the present disclosure.

The processor 130 may identify a depth of the focus of the sensed gaze by using the first cameras 10-1, 10-2 and identify the output depth of the driving information based on the depth of the focus. To be specific, the processor 130 may adjust the depth of the projected driving information so as to be proportional to the depth of the focus of the driver watching the preceding car 300.

By way of example, as illustrated in FIG. 4, in response to the distance between the driver and the preceding car 300 being increased from 50 meters to 100 meters, the depth of the focus of the driver watching the preceding car 300 increases, and the processor 130 may increases the output depth of the driving information. In this case, the electronic apparatus 100 may adjust the depth of the projected driving information in real time by using the pre-stored table where the depth of the driving information is matched with the depth of the focus of the pupils. The processor 130 may identify whether the direction of the sensed gaze moves from the outside to the inside of the specific region. In response to identifying that the direction of the sensed gaze moves from the outside to the inside of the specific region, the processor 130 may output the driving information having the depth identified based on the depth of the focus. Or, in response to identifying that the direction of the sensed gaze moves to the inside of the specific region, the visibility of the outputted driving information may be increased. A detailed description on this operation will be provided below with reference to FIGS. 6A and 6B.

Figure 6A:
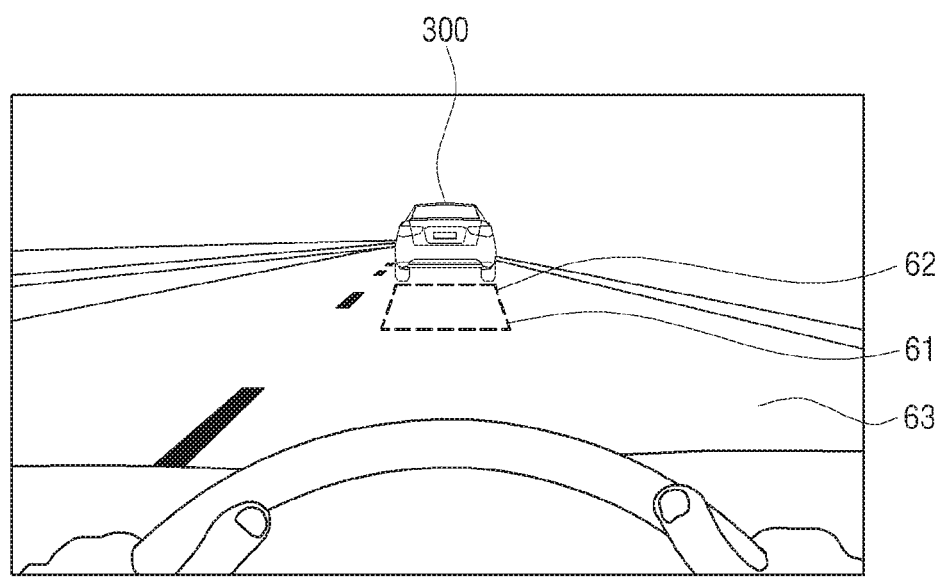
FIGS. 6A and 6B are diagrams provided to describe examples where visibility of the driving information is changed according to an embodiment disclosed herein.
Figure 6B:
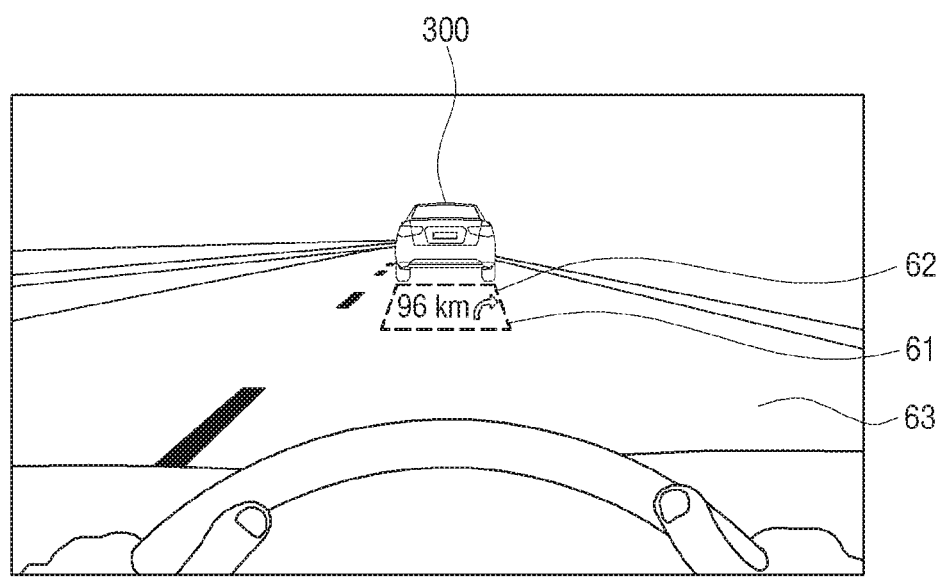

FIGS. 6A and 6B are diagrams provided to describe examples where visibility of the driving information is changed according to an embodiment disclosed herein.

According to an embodiment disclosed herein, the electronic apparatus 100 may track the driver's gaze in real time by using the images photographed by the first cameras 10-1, 10-2. Further, the electronic apparatus 100 may identify whether to project the driving information or adjust the display properties of the projected driving information according to whether the driver's gaze is included in the specific region identified based on the region where the preceding car 300 is viewed through the windshield 200.

To be specific, the processor 130 may track the driver's gaze based on the images received from the first cameras 10-1, 10-2 and the second cameras 11-1, 11-2. The processor 130 may identify whether the driver's gaze is included in a specific region 81 identified as a region onto which the driving information is projected based on the tracked driver's gaze. According to the identified result, the processor 130 may project or do not project the driving information or control to change the display state of the driving information with respect to the windshield 200.

As an example, as illustrated in FIG. 6A, in response to identifying that the driver's gaze is not included in a specific region 61 where the road surface at the lower part of the preceding car 300 is viewed through the windshield 200, the processor 130 may increase the transparency of the driving information to lower the visibility of the driving information projected onto the windshield 200. That is, in response to the driver not watching the lower part of the rear side of the preceding car 300, the processor 130 may adjust the display properties of the driving information so that the visibility of the driving information is lowered. Accordingly, the processor 130 may prevent the driver's cognitive load as the driving information is mixed with the background in front of the car. Further, in response to identifying that the driver's gaze is not included in the specific region 61, the processor 130 may do not project the driving information onto the windshield 200.

As illustrated in FIG. 6A, the processor 130 may control to display only an outline 62 of the region 61 where the driving information is displayed on the windshield 200. The region 61 may be consistent with the specific region which the driver should watch to check the driving information or may be realized as a separate region.

As illustrated in FIG. 6B, in response to the driver's gaze being included in the predetermined specific region around the region where the preceding car 300 is viewed through the windshield 200, the processor 130 may project the driving information or increase the visibility of the projected driving information. By way of example, the processor 130 may decrease the transparency of the driving information to increase the visibility of the driving information.

This operation enables the driver to check the driving information with minimal changes to the gaze direction and the focus only when the driver wants to check the driving information, thereby minimizing the distraction of the visual attention and the visual fatigue.

According to an embodiment disclosed herein, the processor 130 may identify a color of the road surface 63 between the driver's car and the preceding car 300 based on the photographed images of the front side and may control to change a color of the driving information depending upon the color of the road surface 63. To be specific, the processor 130 may adjust the color of the projected driving information to be differ from the identified color of the road surface 63 so as to be distinguished well. By way of example, in response to the color of the road surface 63 being dark, the processor 130 may change the color of the driving information to be a bright color. In response to the color of the road surface 63 being bright, the processor 130 may change the color of the driving information to be a dark color. According to another embodiment, the processor 130 may change the color of the projected driving information to be a complementary color with respect to the color of the road surface 63.

Figure 7:
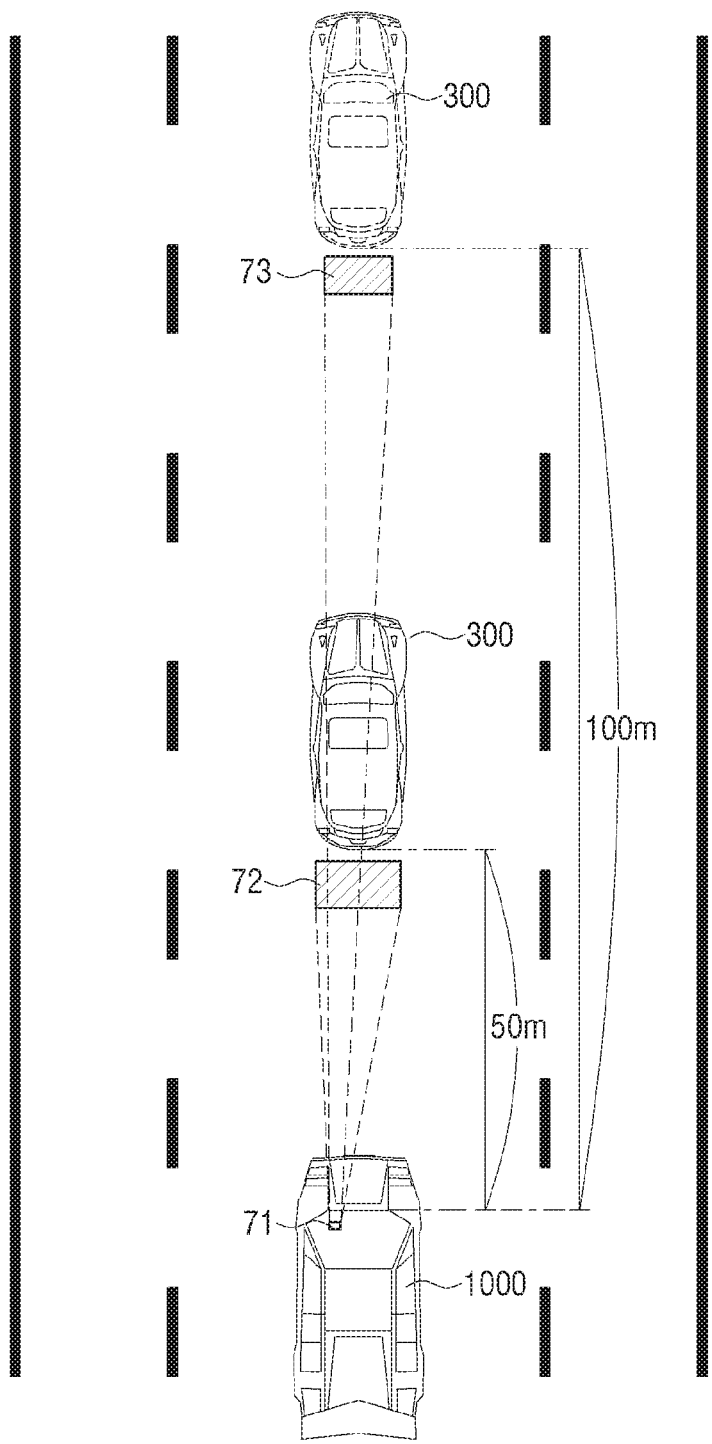
FIG. 7 is a diagram provided to describe an example where a size of the outputted driving information is changed depending upon a distance between the driver and a preceding car according to an embodiment disclosed herein.
Figure 8:
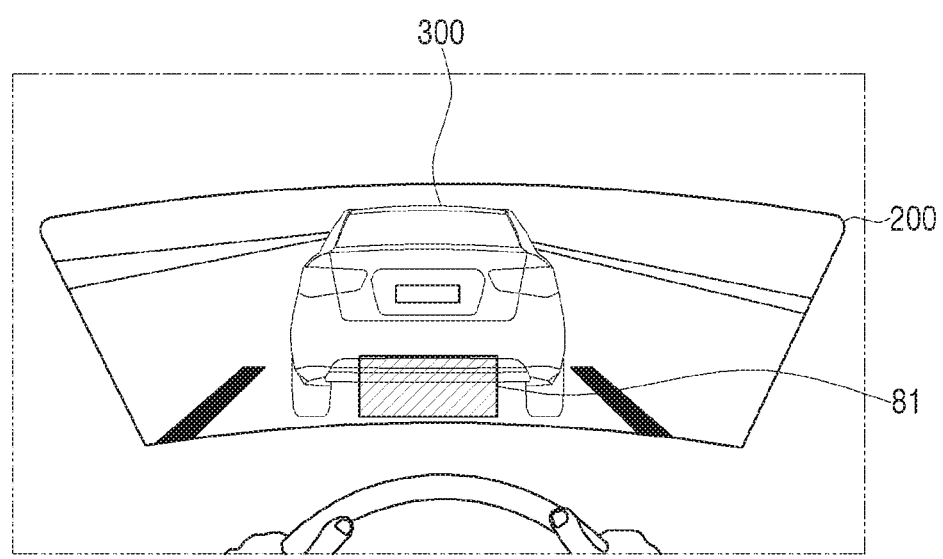
FIG. 8 is a diagram provided to describe a position onto which the driving information is projected when the preceding car is too close to the driver according to an embodiment disclosed herein.

FIGS. 7 and 8 are diagrams provided to describe examples where a position and a size of the projected driving information are changed depending upon a distance between a driver and a preceding vehicle according to an embodiment disclosed herein.

The processor 130 of the electronic apparatus 100 according to an embodiment disclosed herein may identify the distance between the car 1000 of the driver and the preceding car 300 and control to change a size of the driving information to be displayed according to the distance between the driver and the preceding car. In this case, the processor 130 may decrease the size of the projected driving information in response to the distance between the driver and the preceding car 300 being increased and increase the size of the projected driving information in response to the distance between the driver and the preceding car 300 being decreased.

As illustrated in FIG. 7, with the longer distance between the car 1000 and the preceding car 300, the size of the preceding car 300 which is viewed to the driver through the windshield 200 becomes smaller. In this case, the size of the projected driving information may be changed in proportion to the size of the preceding car 300 which is viewed to the driver. Accordingly, a size 72 of the driving information projected onto a specific region 71 of the windshield 200 in response to the preceding car 300 being spaced 50 meter apart from the driver in the car 1000 is relatively larger than a size 73 of the driving information projected onto the windshield 200 in response to the preceding car 300 being spaced 100 meter apart from the car 1000.

FIG. 8 is a diagram provided to describe a position onto which the driving information is projected when the preceding car 300 is too close to the driver according to an embodiment disclosed herein. As illustrated in FIG. 8, when the preceding car 300 is close to the driver, there is not a region where the road surface between the driver's car and the preceding car 300 is viewed through the windshield 200. Accordingly, the processor 130 may project the driving information onto a region 81 out of the region where the preceding car 300 is viewed through the windshield 200 instead of the road surface.

Figure 9:
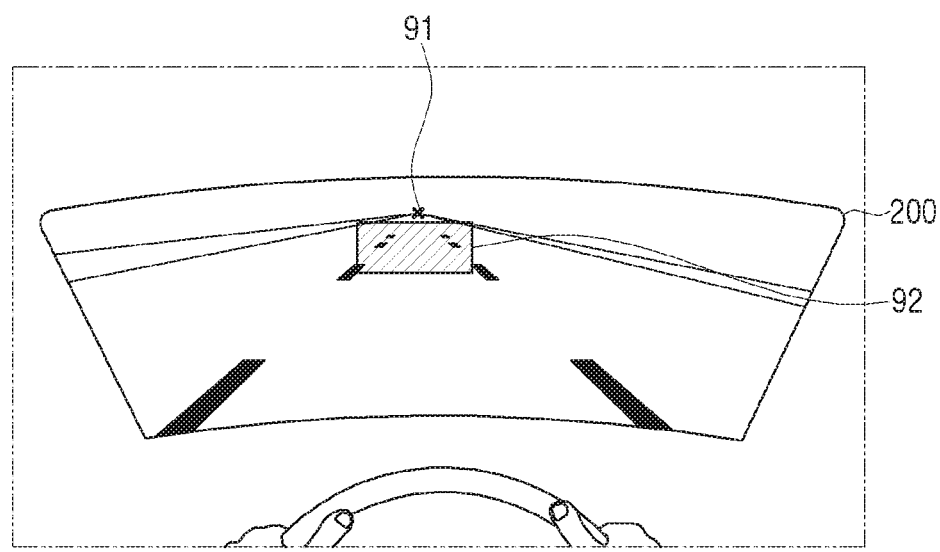
FIG. 9 is a diagram provided to describe a position of a region where the driving information is displayed when there is no preceding car according to an embodiment disclosed herein.

FIG. 9 is a diagram provided to describe a position of a region where the driving information is displayed when there is no preceding car according to an embodiment disclosed herein.

In response to the region where the preceding car is viewed through the windshield 200 not being present, the processor 130 of the electronic apparatus 100 according to an embodiment disclosed herein may recognize a vanishing point of the road surface and identify a specific region around the region where the vanishing point of the road surface is viewed through the windshield 200 as a region onto which the driving information is projected.

As illustrated in FIG. 9, the driver usually watches a vanishing point 91 where parallel lines forming an outline of the road surface meet when there is no preceding car. In this case, the processor 130 may recognize the vanishing point 91 based on various information for recognizing the vanishing point 91 (for example, a difference in the colors of the road surface below the horizon and the sky above the horizon). The various information for recognizing the vanishing point 91 may be pre-stored in the ROM 131 of the processor 130, the storage 140 of the electronic apparatus 100, or the detachable memory. The processor 130 may control to project the driving information onto a specific region 92 in a predetermined size which is located on a lower part of the region where the vanishing point 91 is viewed through the windshield 200.

In the embodiment, in response to the position of the region where the vanishing point 91 is viewed through the windshield 200 being changed while driving, the position of the region onto which the driving information is projected may be also changed correspondingly. In response to the driver's gaze not being included in the specific region 92, the visibility of the driving information may be decreased. In this case, the processor 130 may adjust the depth of the projected driving information so as to correspond to the focus of the driver watching the vanishing point 91.

Figure 10:
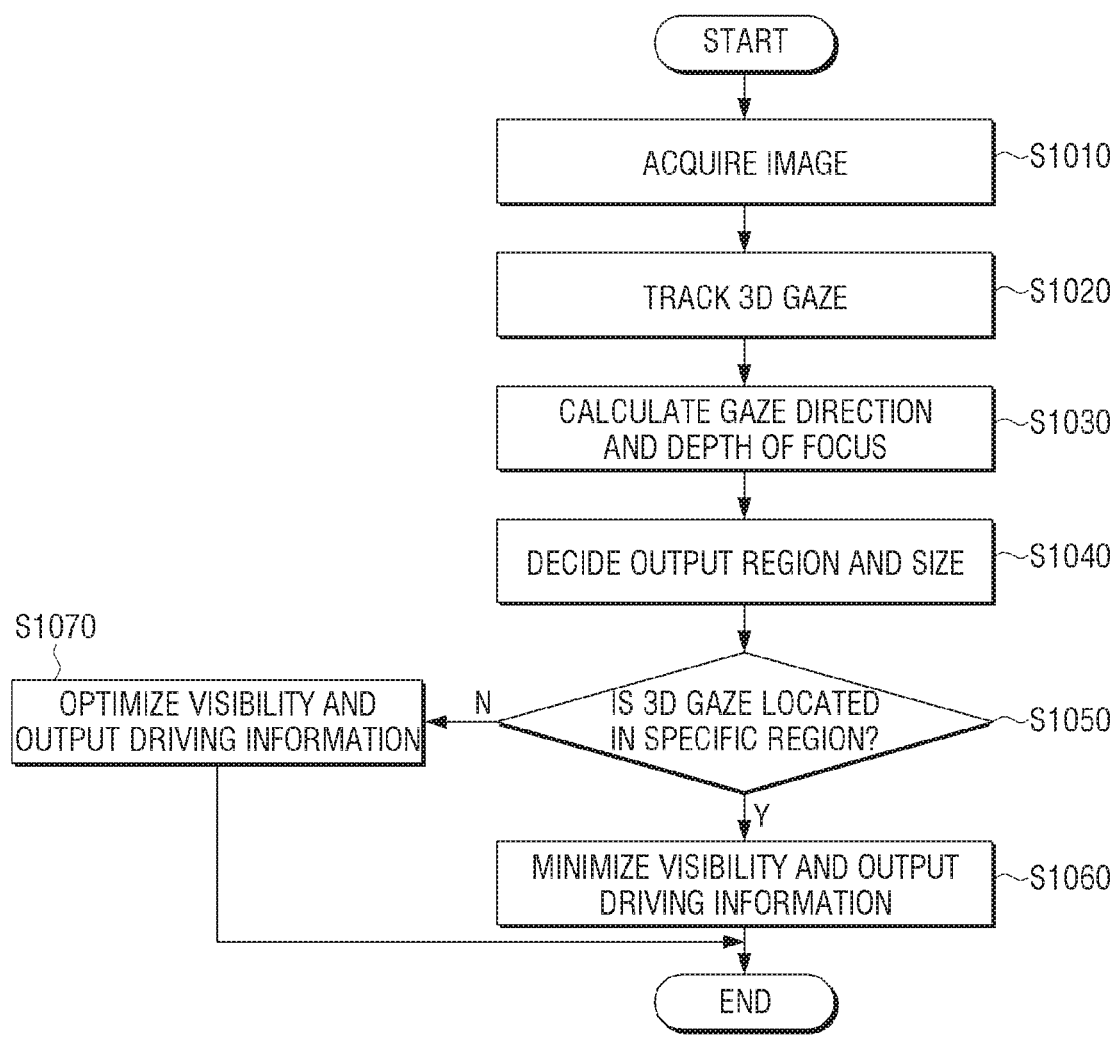
FIG. 10 is a flowchart provided to describe a process of changing the visibility of the driving information depending upon the driver's gaze according to an embodiment disclosed herein.

FIG. 10 is a flowchart provided to describe a process of changing the visibility of the driving information depending upon the driver's gaze according to an embodiment disclosed herein.

The images respectively photographed by a camera for photographing the front side of a car and a camera for photographing the driver are acquired in real time (S1210). Subsequently, the preceding car included in the photographed image of the front side is recognized based on the acquired images, and the distance between the driver's car and the preceding car is predicted (S1220). The region of the windshield onto which the driving information is projected and a size of the driving information to be projected are identified based on the predicted distance to the preceding car and information on the location of the preceding car (S1230). In this case, the driving information may be projected onto an adjacent specific region which is identified based on the region where the preceding car is viewed through the windshield. The depth of the driving information may be adjusted so as to correspond to the predicted distance to the preceding car.

A gaze on a three-dimensional space (hereinafter referred to as '3D gaze') including a direction and a focus of the driver's gaze may be tracked based on the image photographed by the camera for photographing the driver (S1240). In response to the driver's 3D gaze being located in the specific region where the driving information is projected (S1250: Y), the driving information may be projected by optimizing the visibility (S1260). In response to the driver's 3D gaze not being located in the specific region where the driving information is projected (S1250: N), the driving information may be projected by minimizing the visibility (S1270).

Figure 11:
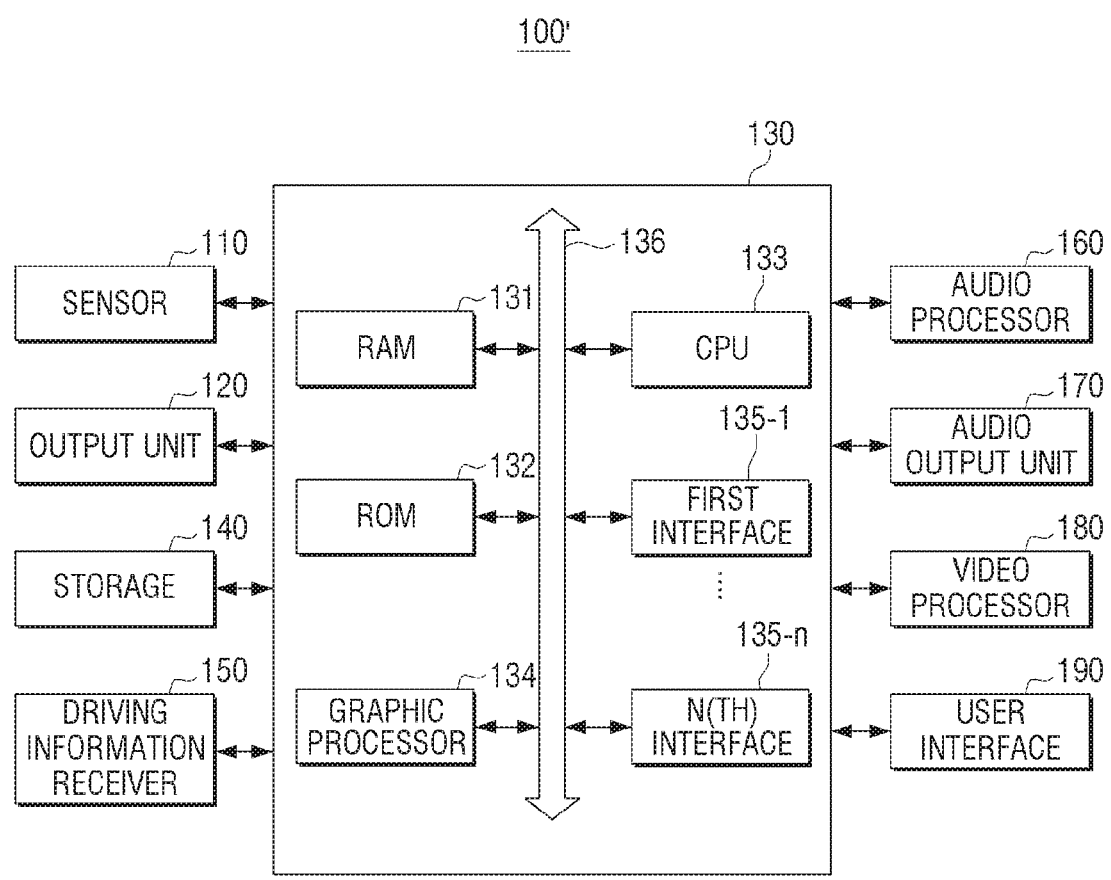
FIG. 11 is a block diagram illustrating a detailed structure of an electronic apparatus according to another embodiment disclosed herein.

FIG. 11 is a block diagram illustrating a detailed structure of an electronic apparatus according to another embodiment disclosed herein.

As illustrated in FIG. 11, an electronic apparatus 100' according to another embodiment disclosed herein includes a sensor 110, an output unit 120, a processor 130, a storage 140, a driving information receiver 150, an audio processor 160, an audio output unit 170, a video processor 180, and a user interface 190. Some of the components of the electronic apparatus 100' are the same as the components of the electronic apparatus 100 of FIG. 1, and a repeated description will be omitted.

The processor 130 may include a Random Access Memory (RAM) 131, a Read-Only Memory (ROM) 132, a Central Processing Unit (CPU) 133, a graphic processor 134, first to n(th) interfaces 135-1 to 135-n, and a bus 136. The RAM 131, the ROM 132, the CPU 133, the graphic processor 134, and the first to n(th) interfaces 135-1 to 135-n may be interconnected through the bus 136.

The ROM 131 may store a command set for system booting. In response to power being supplied by a turn-on command, the CPU 133 may copy an Operating System (O/S) in the storage 140 to the RAM 132 according to the commands stored in the ROM 131 and boot up a system by executing the O/S. Upon completion of the booting operation, the CPU 133 may copy various application programs in the storage 140 to the RAM 131 and execute the application programs copied to the RAM 131 to perform various operations.

The CPU 133 may access the storage 140 and perform the boot-up operation by using the O/S in the storage 140.

Further, the CPU 133 may perform various operations by using diverse programs, contents, and data stored in the storage 140.

The graphic processor 134 may generate a screen including various objects, such as, icons, images, or text, by using a computing unit (not shown) and a rendering unit (not shown). The computing unit may compute attribute values, such as, coordinate values, shapes, sizes, and colors of the objects, according to a layout of the screen. The rendering unit may generate a screen including the objects in various layouts based on the attribute values computed by the computing unit.

The first to n(th) interfaces 135-1 to 135-n may be connected to the above-described various components. One of the interfaces 135-1 to 135-n may be realized as a network interface connected to an external apparatus through a network.

The above-described operations of the processor 130 may be performed by the programs stored in the storage 140.

The storage 140 may store various data, such as, an O/S software module for operating the electronic apparatus 100' or diverse multimedia contents. To be specific, the storage 140 may store a base module for processing signals transmitted from respective hardware of the electronic apparatus 100', a storage module for managing a database (DB) or registry, a security module, a communication module, a graphic processing module, an audio processing module, or the like. The processor 130 may control overall operations of the electronic apparatus 100' by using diverse modules in the storage 140.

The driving information receiver 150 receives the driving information including the navigation information from an external apparatus, for example, a navigation device installed in a car. The driving information receiver 150 may communicate with the satellite, an external server, or a user terminal and receive the driving information including the position information on the car and road conditions. In this case, the driving information receiver 150 may use various communications methods using Radio Frequency (RF) and InfraRed (IR), such as, a wireless Local Area Network (LAN), cellular, Device to Device (D2D), Bluetooth, Bluetooth Low Energy (BLE), 3rd Generation (3G), Long Term Evolution (LTE), ad-hoc Wireless-Fidelity (Wi-Fi) Direct, LTE Direct, Zigbee, Near Field Communication (NFC), and so on.

The audio processor 160 processes the audio data. The audio processing operation may be also executed by the audio processing module stored in the storage 140.

The audio output unit 170 outputs the audio data processed by the audio processor 160. The audio output unit 170 may include a receiver terminal (not shown) and a speaker (not shown).

The video processor 180 may perform various image processing operations, such as, decoding, scaling, noise filtering, frame rate conversion, or resolution conversion, with respect to the content. The video processing operation may be also executed by a video processing module stored in the storage 140.

The user interface 190 senses a user interaction for controlling overall operations of the electronic apparatus 100'. Particularly, the user interface 190 may include diverse interaction sensing devices, such as, a microphone (not shown).

According to another embodiment disclosed herein, the electronic apparatus 100' may further include at least one first camera for photographing the driver in the car and at least one second camera for photographing the front side of the car.

Figure 12:
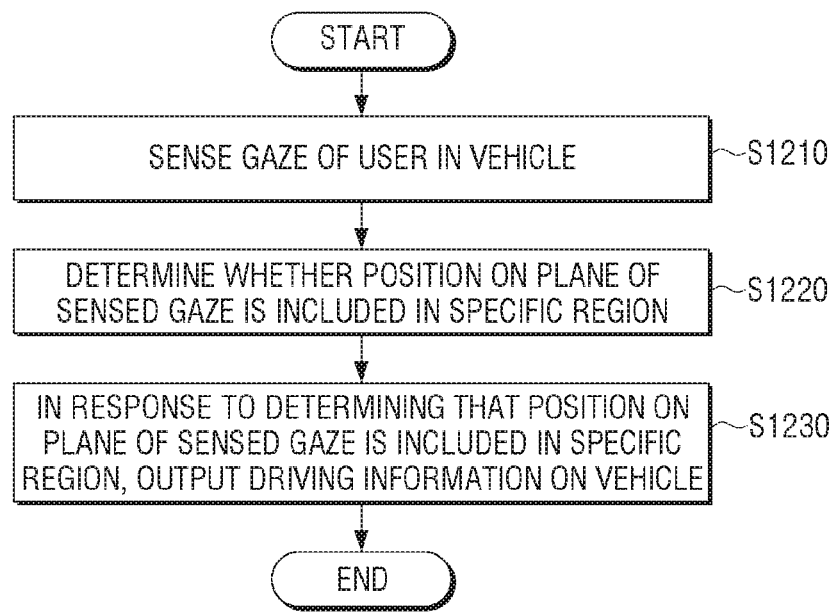
FIG. 12 is a flowchart provided to describe a method for controlling an electronic apparatus according to an embodiment disclosed herein.

FIG. 12 is a flowchart provided to describe a method for controlling an electronic apparatus according to an embodiment disclosed herein.

A gaze of a user in a vehicle is sensed (S1110).

Subsequently, whether a position on a plane of the sensed gaze is included in a specific region is identified (S1120). In this case, in response to a gaze coordinate representing a direction of the sensed gaze on a virtual plane being located in the predetermined specific region, it may be identified that the direction of the sensed gaze points the specific region.

In response to identifying that the position on the plane of the sensed gaze being included in the specific region, the driving information on the vehicle is outputted (S1130). In this case, the specific region may be a region which is adjacent to a region where the preceding car is viewed through the windshield, out of the region where the road surface between the user's car and the preceding car is viewed through the windshield. In this case, in response to the region where the preceding car is viewed through the windshield not being present, a region adjacent to a vanishing point of the road surface may be identified as the specific region.

Subsequently, the output depth of the driving information may be identified based on a distance to an object corresponding to the position on the plane of the sensed gaze, and the driving information may be outputted to the identified depth. Or, the output depth of the driving information may be identified based on a focus of the sensed gaze, and the driving information may be outputted to the identified depth.

In response to the direction of the sensed gaze moving from the outside to the inside of the specific region, the driving information may be outputted to the depth identified based on the depth of the focus. In this case, the output depth of the driving information may be identified so as to be proportional to the depth of the focus of the sensed gaze.

According to the above-described various embodiments, it is possible to minimize the focus change of the driver's gaze and acquire the driving information through the HUD, thereby minimizing the distraction of the driver's visual attention and the visual fatigue. Further, it is possible to enhance the driver's convenience and provide safer driving conditions.

The methods for controlling the electronic apparatus according to the above-described various embodiments may be realized as a program and stored in diverse recording mediums. That is, a computer program which is executable by various processors and is capable of performing the above-descried various methods may be stored and used in the recording medium.

By way of example, there may be provided a non-transitory computer readable medium including a program for executing the operations of sensing a gaze of a user in a vehicle, identifying whether a position on a plane of the sensed gaze is included in a specific region, and in response to identifying that the position on the plane of the sensed gaze is included in the specific region, outputting the driving information on the vehicle.

The non-transitory computer readable medium refers to a machine-readable medium that stores data semi-permanently unlike a register, a cache, or a memory that stores data for a short time. Particularly, the above-described various applications and programs may be stored in and provided through the non-transitory computer readable medium, such as, a Compact Disc (CD), a Digital Versatile Disc (DVD), a hard disc, a Blu-ray disc, a Universal Serial Bus (USB), a memory card, a Read-Only Memory (ROM), or the like.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to a person having ordinary skill in the art.

What is claimed is:

1. An electronic apparatus comprising:
   an outputter configured to output an image comprising driving information on a first vehicle;
   a sensor;
   a camera configured to photograph an object outside the first vehicle; and
   a processor configured to:
      in response to an x, y position of a gaze of a user sensed by the sensor being included in a specific region on a virtual x-y plane, control the outputter to output the image, and
      control the outputter to control a depth and an image display property of the image,
   wherein the image display property comprises at least one from among a color, a size and a transparency of the image,
   wherein a depth of a z-axis corresponds to a focus of the sensed gaze, and
   wherein the process is further configured to identify a second region which is adjacent to a first region where the object is viewed through a windshield of the first vehicle as an output region for outputting the image comprising the driving information based on the image photographed by the camera.

2. The apparatus as claimed in claim 1, wherein in response to a gaze coordinate representing a direction of the sensed gaze on the virtual x-y plane being located in a predetermined specific region of the virtual x-y plane, the processor identifies that the direction of the sensed gaze points the specific region.

3. The apparatus as claimed in claim 1, wherein the processor identifies an output position of the image comprising the driving information based on a distance to an object corresponding to the position on the plane of the sensed gaze.

4. The apparatus as claimed in claim 1, wherein in response to a direction of the sensed gaze moving from the outside to the inside of the specific region, the processor outputs the image comprising the driving information to the output position identified based on the depth of the focus.

5. The apparatus as claimed in claim 1, wherein the processor identifies the output position of the image comprising the driving information to be proportional to the depth of the focus of the sensed gaze.

6. The apparatus as claimed in claim 1, wherein the processor identifies a region of the windshield of the first vehicle corresponding to the specific region as the output region for outputting the image comprising the driving information.

7. The apparatus as claimed in claim 6, wherein the output region is fixed to a region of the windshield by setting the specific region.

8. The apparatus as claimed in claim 1, wherein the object includes the second vehicle located in front of the first vehicle, and wherein the processor identifies a lower part of a region where the second vehicle is viewed through the windshield as the output region.

9. The apparatus as claimed in claim 1, wherein in response to a direction of the sensed gaze not pointing the specific region, the processor increases the transparency of the image comprising the driving information and outputs the driving information.

10. A method for controlling an electronic apparatus, the method comprising:
   sensing a gaze of a user in a first vehicle;
   photographing an object outside the first vehicle;
   identifying whether an x, y position of the gaze of the user sensed by the sensor is included in a specific region on a virtual x-y plane;
   outputting an image, in response to identifying that the x, y position on the virtual x-y plane of the sensed gaze is included in the specific region; and
   controlling a depth and an image display property of the image comprising the driving information,
   wherein the image display property comprises at least one of a color, a size and a transparency of the image,
   wherein a depth on a z-axis corresponds to a focus of the sensed gaze, and
   wherein the identifying comprises identifying a second region which is adjacent to a first region where the object is viewed through a windshield of the first vehicle as an output region for outputting the image comprising the driving information based on the image.

11. The method as claimed in claim 10, wherein in response to a gaze coordinate representing a direction of the sensed gaze on the virtual x-y plane being located in a predetermined specific region of the virtual x-y plane, the identifying comprises t identifying that the direction of the sensed gaze points the specific region.

12. The method as claimed in claim 10, wherein the outputting comprises identifying an output position of the image comprising the driving information based on a distance to an object corresponding to the position on the plane of the sensed gaze and outputting the driving information to the identified output position.

13. The method as claimed in claim 10, wherein in response to a direction of the sensed gaze moving from the outside to the inside of the specific region, the outputting comprises outputting the image comprising the driving information to the output position identified based on the depth of the focus.

14. The method as claimed in claim 10, wherein the outputting comprises identifying the output position of the image comprising the driving information to be proportional to the depth of the focus of the sensed gaze.

15. The method as claimed in claim 10, further comprising:
   identifying a region of the windshield of the first vehicle corresponding to the specific region as the output region for outputting the image comprising the driving information.

16. The method as claimed in claim 15, wherein the output region is fixed to one region of the windshield by setting the specific region.

* * * * *